United States Patent
Fonzes et al.

(10) Patent No.: US 6,917,286 B2
(45) Date of Patent: Jul. 12, 2005

(54) DEVICE FOR MONITORING PRESSURES OF VEHICLE TIRES

(75) Inventors: Georges Fonzes, Toulouse (FR); Philippe Lefaure, Montbrun (FR); Martin Fischer, Regensburg (DE)

(73) Assignees: Siemens VDO Automotive, Toulouse Cedex (FR); Siemens AG, Munich (DE)

(*) Notice: Subject to any disclaimer, the term of this patent is extended or adjusted under 35 U.S.C. 154(b) by 91 days.

(21) Appl. No.: 10/260,358

(22) Filed: Oct. 1, 2002

(65) Prior Publication Data

US 2003/0062995 A1 Apr. 3, 2003

(30) Foreign Application Priority Data

Oct. 2, 2001 (FR) .............................. 01 12639

(51) Int. Cl.[7] .............................................. B60C 23/00
(52) U.S. Cl. ........................ 340/447; 340/442; 340/444; 340/445; 340/448
(58) Field of Search ................................. 340/442, 444, 340/445, 447, 448, 446; 73/146, 146.2, 146.3, 146.5; 200/61.25

(56) References Cited

U.S. PATENT DOCUMENTS

| | | | |
|---|---|---|---|
| 5,656,993 A | * | 8/1997 | Coulthard .................. 340/442 |
| 5,783,992 A | * | 7/1998 | Eberwine et al. ........... 340/445 |
| 6,181,241 B1 | | 1/2001 | Normann et al. |
| 6,278,363 B1 | * | 8/2001 | Bezek et al. ................. 340/442 |
| 6,340,930 B1 | * | 1/2002 | Lin ............................. 340/447 |
| 6,518,876 B1 | * | 2/2003 | Marguet et al. ............. 340/447 |

FOREIGN PATENT DOCUMENTS

| | | |
|---|---|---|
| DE | 196 52 365 | 4/1998 |
| DE | 199 38 431 | 2/2001 |
| FR | 2 774 178 | 7/1999 |

* cited by examiner

Primary Examiner—Hung Nguyen
(74) Attorney, Agent, or Firm—Young & Thompson

(57) ABSTRACT

The device comprises:
a sensor arranged at the level of each tire whose pressure is to be monitored, a transmitter associated with each sensor, and a common receiver intended to receive the information sent by the transmitters, at least one detector device making it possible to detect a transmission in the transmission frequency range of the transmitters associated with the sensors, and each detector device being linked to a central unit in such a way as to be able to send this central unit a signal indicating that a transmission in the relevant frequency range is detected.

16 Claims, 1 Drawing Sheet

DEVICE FOR MONITORING PRESSURES OF VEHICLE TIRES

FIELD OF THE INVENTION

The present invention relates to a device for monitoring a parameter, such as for example the pressure, of the tires of a vehicle, in particular a motor vehicle.

BACKGROUND OF THE INVENTION

It is known to equip a motor vehicle with a system for monitoring the pressure of its tires. A pressure sensor is then placed in each tire. Each sensor is associated with a transmitter which sends the measured information to a central unit intended to process these data. Transmission is generally effected by a radiofrequency (RF transmission) with a frequency of 433 MHz. A single RF receiver is placed on the vehicle and collects the information dispatched by the transmitters so as to send them to the central unit.

Various, generally complex, processes are used to be able to determine for each item of information received the tire to which it corresponds. Document FR-2 774 178 discloses for example a process for locating and for recognizing the position of the wheels on a vehicle. Here, the wheels are each equipped with a sensor transmitting a detection signal representative of a state of the corresponding wheel. The vehicle is for its part equipped with a device for processing the detection signal. The process described in this document consists in determining a signature of a detection signal transmitted by a sensor carried by a wheel and in storing this signature and the corresponding position of the wheel in the processing device. Recognition of the position of a wheel is obtained by analyzing the signature of a detection signal and by comparing this signature with the stored signatures.

Such a process is difficult to implement. Furthermore, since the sensors are remote from the receiver, perturbations may disturb the sending of information and also the signature of the signal. It is also possible to have similar signatures which are difficult to differentiate. This is the case in particular when the receiver is arranged at the front of the vehicle and one wishes to distinguish the information coming from the rear left wheel from that originating from the rear right wheel.

Other processes of determination are known to the person skilled in the art. Without entering into details here, some of them require the presence of an LF (low frequency) link for communicating between the sensors and the receiver, others an inclinometer and/or an accelerometer at the level of each wheel.

SUMMARY OF THE INVENTION

So the aim of the present invention is to provide a device making it possible to simply, and reliably, determine the origin of information transmitted by a pressure sensor to the central unit.

For this purpose, it proposes a device for monitoring the pressure, or another parameter, of the tires of a vehicle comprising a sensor arranged at the level of each tire to be monitored, an electromagnetic signals transmitter associated with each sensor as well as a common receiver intended to receive the information sent by the transmitters.

According to the invention, this device furthermore comprises at least one detector device making it possible to detect a transmission in the transmission frequency range of the transmitters associated with the sensors, and each detector device is linked to a central unit in such a way as to be able to send this central unit a signal indicating that a transmission in the relevant frequency range is detected.

With such a device, it is sufficient to adjust the sensitivity of each detector device in such a way that it detects only the transmissions effected by the closest transmitter (or the closest transmitters) and not those effected by more remote transmitters. Thus, when the computer receives a frame transmitted by a sensor via its transmitter, it receives a signal from the detector device at substantially the same time indicating to it that a signal has been detected. The computer then associates the signal transmitted with the detector device and since it knows the latter's position, it can deduce therefrom the location of the sensor which transmitted the frame.

Preferably, the transmission frequency used is 433 MHz.

In one embodiment, each detector device making it possible to detect a transmission effected by the corresponding transmitter comprises, for example, an antenna made on a printed circuit and a diode. This device can furthermore comprise a signal processing system.

For better reliability of location, it is preferable that with each transmitter there be associated a corresponding detector device. However, to limit the cost of the device, it is also possible to envisage that with each transmitter except one there is associated a corresponding detector device. The sensor corresponding to the transmitter with which no detector device is associated is then located by deduction.

In the case where only front/rear, or possibly right/left location is desired, a detector device can then be associated with two transmitters. To limit the costs of the device according to the invention, it is then possible to provide for just a single detector device for a vehicle in which only front/rear location is desired. This detector device is then arranged at the level of a front or rear axle assembly and location is effected as a function of the simultaneous or nonsimultaneous reception of a frame and of a signal from the detector device.

In a preferred embodiment of the device according to the invention, there is provision for a signal sent by each detector device to the central unit to be an analog signal taking either the value 0 or the value 1 as a function of the absence of detection or conversely the detection of a transmission in the relevant frequency range.

BRIEF DESCRIPTION OF THE DRAWINGS

The present invention will be better understood with the aid of the description which follows, given with reference to the appended diagrammatic drawing in which:

A single FIG. 1 diagrammatically represents a motor vehicle viewed from above equipped with a device for monitoring the pressure of the tires according to the invention.

DETAILED DESCRIPTION OF THE INVENTION

Figure 1:
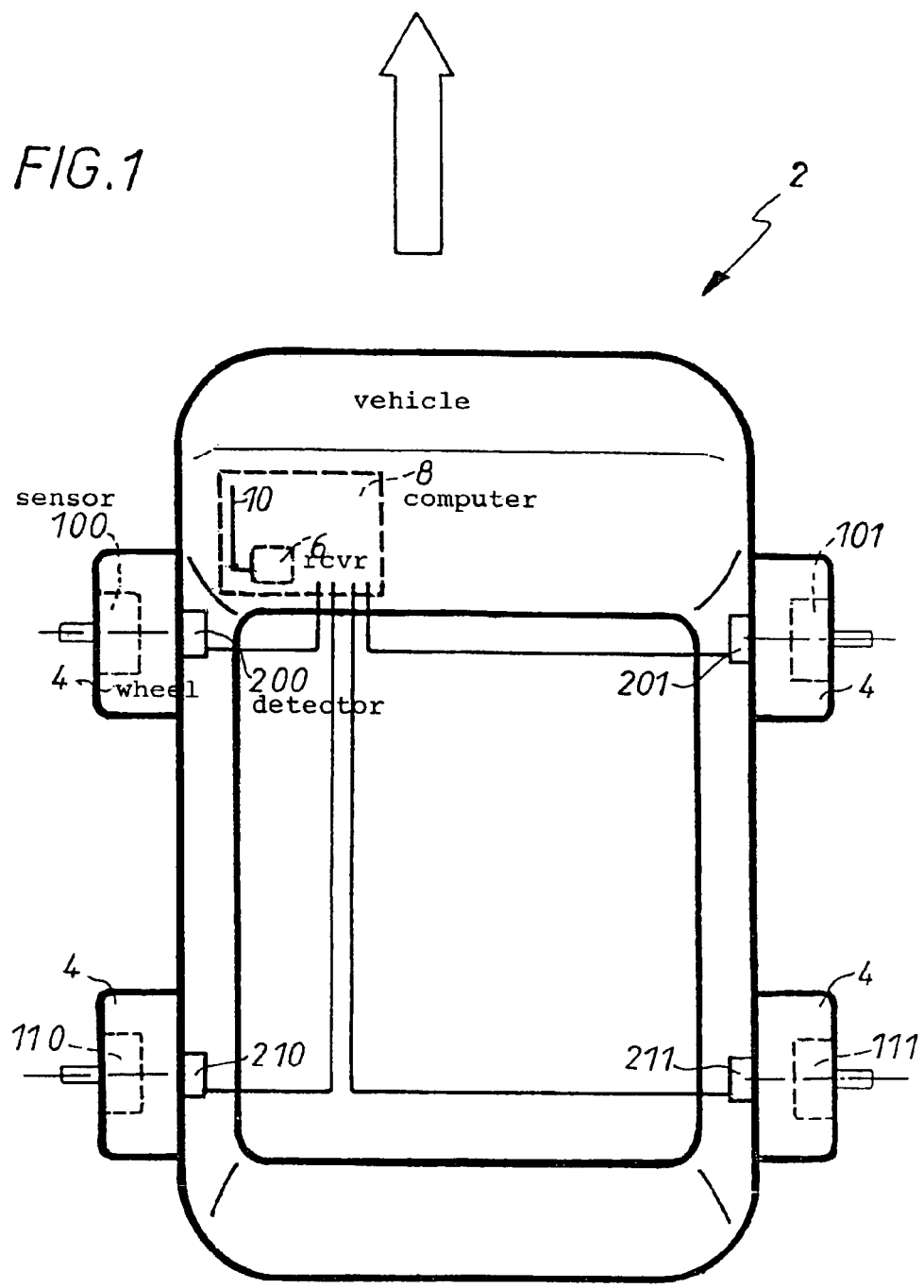

In this single FIGURE is seen a vehicle 2, viewed from above, fitted with four wheels 4, each of these wheels being furnished with a tire. At the level of each tire of the wheels 4 is a sensor. It is assumed in the subsequent description that pressure sensors are involved here, but it is also possible to imagine sensors of another type for example a temperature sensor. Each sensor is for example fixed on the valve which allows the introduction and removal of air of the corresponding tire. The vehicle 2 is then fitted with four sensors: a front left sensor bearing the reference 100, a front right sensor bearing the reference 101, a rear left sensor bearing the reference 110 and a rear right sensor bearing the reference 111. Each of the sensors is equipped with an RF (radiofrequency) transmitter. The frequency used here is for example 433 MHz but of course another frequency could be chosen. In the figure, the size of the sensors is not to scale, the sensors being represented enlarged so as to be more visible.

The vehicle 2 is for its part equipped with a single RF receiver 6 intended to receive the signals transmitted by the four sensors 100, 101, 110, 111. This receiver 6 is integrated into a controllable computer 8. The signals arriving at the receiver 6 are received by way of an antenna 10. The latter is an antenna integrated with the computer 8. It is for example an antenna printed on a circuit of this computer. It could however also be an external antenna, for example an antenna of quarter wave type. It is assumed here that all four sensors 100, 101, 110, 111 are identical but different sensors may be envisaged.

In the example represented in the drawing, the computer 8, and hence consequently the internal antenna 10, is placed in the left part of the dashboard of the vehicle 2. This position is of no importance in the present invention since the range of the RF transmitters is big enough for the receiver 6 to receive without problems the electromagnetic signals transmitted by the RF transmitters associated with the four sensors.

The device making it possible to monitor the pressure of the tires further comprises four detector devices making it possible to detect an RF signal such as that transmitted by the transmitters associated with the sensors 100, 101, 110 and 111. These detector devices are subsequently referred to as "satellites" and bear the references 200, 201, 210 and 211.

Each satellite is arranged at the level of a fender and is fixed with respect to the vehicle 2. The satellite 200 is placed in the front left fender, the satellite 201 in the front right fender, the satellite 210 in the rear left fender and the satellite 211 in the rear right fender.

Each satellite comprises a printed circuit, also sometimes referred to a PCB (standing for printed circuit board), on which is integrated an RF antenna, as well as a diode. Each satellite generates an analog signal. When an RF signal is received by the antenna of the satellite, this signal equals 1 while when no signal is received or when a signal is too weakly perceived, this signal equals 0. The output voltage from the satellite may be for example 0–5 V or 0–12 V. The satellite may possibly also comprise a signal conditioning and/or processing system.

The sensitivity of each satellite is determined through the choice of the antenna and of the diode. It is chosen in such a way that each satellite delivers a signal equal to 1 when the closest transmitter is transmitting an RF signal and also such that if only the one or several of the other transmitters are transmitting an RF signal, then the output signal from the satellite equals 0. Thus, for example, if the transmitter of the sensor 100 is transmitting, the satellite 200 generates a signal equal to 1 and all the other satellites 201, 210 and 211 generate a signal equal to 0 and if the three transmitters corresponding to the sensors 101, 110 and 111 are dispatching, even simultaneously, an RF signal, the signal transmitted by the satellite 200 equals 0.

Each satellite is linked to the central computer 8 so as to be able to send its output signal to this computer. For this purpose, this computer comprises four analog inputs each corresponding to a satellite.

In the above-described device according to the invention, a satellite 200, 201, 210 or 211 is placed in proximity to each wheel 4 of the vehicle 2. Each satellite is selective owing to its weak sensitivity.

Each time an RF signal is detected by a satellite, the latter dispatches a signal of value 1 to the central unit. Otherwise, the satellite output signal equals 0. To limit the retail cost of a satellite, the latter is not fitted with means rendering it capable of recognizing the content of the RF signal which it senses.

The computer 8 is capable of determining which satellite has dispatched a signal equal to 0 or 1 since it knows which input is receiving this signal and with each input there corresponds one and only one satellite. So when a transmitter associated with a sensor dispatches an RF frame to the computer 8 via the receiver 6, this frame is detected via the corresponding satellite placed in proximity but by no other satellite. So when the computer 8 receives the RF frame and decodes it, it recognizes the identifier of the sensor included in the frame sent. So by looking to see which satellite has delivered at the same moment, or with a known or determinable time offset, a signal equal to 1, the computer 8 is capable of associating the sensor with the corresponding RF satellite. In this way, the computer 8 deduces therefrom the position on the vehicle of the sensor which has transmitted the analyzed frame.

In order to make the information received from a sensor by the computer 8 secure, it is for example possible to make provision to receive several frames from one and the same sensor before definitively locating it.

To optimize the cost of the device described hereinabove, it is possible to make provision for just three satellites in respect of a vehicle comprising four wheels. The sensor which is not associated with any satellite is then located by deduction. If an RF frame is received by the computer 8 via the receiver 6 with a known identifier but without a signal equal to 1 being received simultaneously, the computer then deduces therefrom that the frame has been dispatched by the sensor with which no satellite is associated.

It is also obvious to the person skilled in the art on reading the foregoing that it is also possible to use just two, or even only one satellite if only front/rear or possibly left/right location is to be achieved.

The device makes it possible to locate a wheel, or more precisely a corresponding sensor, if an RF frame (or a frame at another frequency) is transmitted. Although it was indicated above that in order for the result relating to the location of the sensor to be made secure, the reception of several frames is preferable, a single transmitted frame suffices to locate the source of this frame. Moreover, as compared in particular with the prior art systems implementing inclinometers and/or accelerometers, the device according to the invention makes it possible to locate a sensor whether or not the vehicle is stationary. It is unnecessary here to wait for the vehicle to begin moving in order to determine the location of the various sensors. Likewise, the device according to the invention gives results which are independent of the speed with which the vehicle is moving or of the path taken (straight line or turns).

The loading of a vehicle may have an influence on the RF frames transmitted by the transmitters associated with the sensors. These variations, for certain locating devices of the prior art, may influence the result of the locating of the sensors. This is definitely not the case with a device according to the invention.

The detectors, referred to as satellites, implemented are simple and of modest retail price. The device according to the invention requires no particular functionality at the level of the wheels of the vehicle (presence for example of an LF or other detector). It is also independent of the other systems which may be found on board the vehicle: sensor of an anti-lock braking system, steering wheel angle sensor, etc.

Finally, the adapting of a device according to the invention to a device of the prior art may be achieved easily since it is sufficient to make provision for the installing of the RF satellites, their link to the computer and the presence on the latter of analog inputs.

As compared with the known devices of the art prior to the present invention allowing the locating of a sensor by using transmissions of electromagnetic signals in the radiofrequency (RF) domain, the device according to the invention does not use the strength or the signature of the RF signals transmitted but uses only and in a novel manner only the presence of these RF signals.

The present invention is not limited to the preferred embodiment described hereinabove and to the variants alluded to, but it also relates to any variant within the scope of the person skilled in the art within the context of the claims hereinafter.

What is claimed is:

1. A device for monitoring a parameter of tires of a vehicle comprising:
   a respective sensor adjacent to each tire to be monitored,
   an electromagnetic signals transmitter associated with each said sensor,
   a common receiver that receives transmissions from the transmitters and that is associated with a central unit,
   at least one detector device separate from the common receiver and that receives and detects the transmissions, wherein each said detector device is linked to the central unit to send the central unit a signal indicating that the transmissions have been detected,
   wherein the signal sent by each said detector device to the central unit is an analog signal taking a value of 0 or 1 as a function of detection or lack of detection of the transmission.

2. The device as claimed in claim 1, wherein a transmission frequency of the transmitters is 433 MHz.

3. The device as claimed in claim 2, wherein each said detector device comprises an antenna on a printed circuit and a diode.

4. The device as claimed in claim 2, wherein one said detector device is associated with each said transmitter.

5. The device as claimed in claim 2, wherein one said detector device is associated with each said transmitter except one.

6. The device as claimed in claim 2, wherein one said detector device is associated with two of said transmitters.

7. The device as claimed in claim 1, wherein each said detector device comprises an antenna on a printed circuit and a diode.

8. The device as claimed in claim 7, wherein each said detector device further comprises a signal processing system.

9. The device as claimed in claim 7, wherein one said detector device is associated with each said transmitter.

10. The device as claimed in claim 7, wherein one said detector device is associated with each said transmitter except one.

11. The device as claimed in claim 7, wherein one said detector device is associated with two of said transmitters.

12. The device as claimed in claim 1, wherein one said detector device is associated with each said transmitter.

13. The device as claimed in claim 1, wherein one said detector device is associated with each said transmitter except one.

14. The device as claimed in claim 1, wherein one said detector device is associated with two of said transmitters.

15. A device for monitoring a parameter of vehicle tires, comprising:
   plural sensors, each of said sensors being associated with a respective vehicle tire to be monitored for sensing a parameter, each of said sensors having a transmitter for transmitting signals conveying data associated with the sensed parameter;
   a central unit having a receiver for receiving the signals and processing the data conveyed therein; and
   plural detectors that are each connected to said central unit through a respective separate connection, each of said detectors being positioned to receive the signals from one, but not all, of said sensors, and sending a detection signal to said central unit through said respective separate connection upon receipt of the respective one of the signals,
   wherein receipt of the detection signal by said central unit from said respective separate connection indicates to said central unit that the respective one of said sensors is transmitting the respective signal conveying the data, and
   wherein the detection signal sent by said detectors to said central unit is an analog signal taking a value of 0 or 1 as a function of detection or lack of detection of the respective signal.

16. The device of claim 15, wherein each of said plural detectors is positioned to receive the signals from only one of said sensors.

* * * * *